(12) United States Patent
Marks

(10) Patent No.: US 6,615,574 B1
(45) Date of Patent: Sep. 9, 2003

(54) SYSTEM FOR COMBINING FLOW FROM COMPRESSOR BLEEDS OF AN INDUSTRIAL GAS TURBINE FOR GAS TURBINE PERFORMANCE OPTIMIZATION

(75) Inventor: Paul T. Marks, Clifton Park, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/482,946

(22) Filed: Jan. 14, 2000

(51) Int. Cl.[7] .............................. F02C 7/18; F02C 7/00
(52) U.S. Cl. ..................... 60/39.02; 60/39.07; 60/39.75
(58) Field of Search .............................. 60/39.02, 39.07, 60/39.23, 39.75

(56) References Cited

U.S. PATENT DOCUMENTS

| | | | | |
|---|---|---|---|---|
| 2,257,982 A | * | 10/1941 | Seippel ..................... | 60/39.07 |
| 3,446,425 A | * | 5/1969 | Cleeves ..................... | 60/39.07 |
| 3,487,993 A | * | 1/1970 | Rannenberg ............... | 60/39.07 |
| 4,351,150 A | * | 9/1982 | Schulze ..................... | 60/39.07 |
| 4,711,084 A | | 12/1987 | Brockett | |
| 4,967,552 A | * | 11/1990 | Kumata et al. ............ | 60/39.75 |
| 5,063,963 A | * | 11/1991 | Smith ......................... | 60/39.07 |
| 5,161,364 A | * | 11/1992 | Bruun et al. ............... | 60/39.07 |
| 5,174,105 A | * | 12/1992 | Hines ......................... | 60/39.07 |
| 5,185,997 A | * | 2/1993 | Nishijima ................... | 60/39.07 |
| 5,468,123 A | * | 11/1995 | Guimier et al. ............ | 60/39.75 |

* cited by examiner

Primary Examiner—Ted Kim
(74) Attorney, Agent, or Firm—Nixon & Vanderhye

(57) ABSTRACT

A gas turbine cooling and sealing air supply system design for an industrial gas turbine is provided which effectively eliminates the need to dissipate bleed pressure across an orifice or similar device, thereby to optimize full load ISO performance. This flow system is realized by providing cross over valves/ejectors which allow mixing of extractions of different pressures. Control valves provided in the various extraction and cross over flow paths selectively control and determine the flow of extraction bleed air from the various stages of the compressor and between the extraction flow paths. Once the air is combined, its combined pressure and temperature is somewhere between the lower and higher pressure extraction air original pressures and temperatures. Thus, the proper pressure can be supplied to, e.g., the turbine with the least expensive, in terms of work invested, mixture of air with the lowest temperature.

16 Claims, 3 Drawing Sheets

SYSTEM FOR COMBINING FLOW FROM COMPRESSOR BLEEDS OF AN INDUSTRIAL GAS TURBINE FOR GAS TURBINE PERFORMANCE OPTIMIZATION

BACKGROUND OF THE INVENTION

The present invention relates to a system for optimizing gas turbine performance by minimizing performance loss resulting from cooling and sealing air provided by compressor casing bleed ports.

BACKGROUND OF THE INVENTION

The axial location or stage at which air is bled from the compressor is determined by the pressure required to drive the specific systems to be serviced by that air. To ensure sufficiently high delivery pressure, in general it is desirable to select a source with the highest possible pressure. However, bleeding air from the earliest possible stage of the compressor will increase overall gas turbine efficiency by reducing the amount of compressor work invested in the extracted air and will therefore reduce the temperature of the extracted air. Therefore, it is desirable to achieve the highest possible system supply pressure from the earliest and lowest pressure stage of the compressor.

Conventionally, compressor belts have been located in various positions in the compressor casing to extract air of proper pressure for turbine cooling and leakage over all turbine-operating conditions. However, minimum supply to sink pressures always occur at conditions other than full load ISO day and, thus, there is excess supply pressure and flow during full load ISO day operations. Consequently, during full load ISO day operation the bleed air must be dissipated across a valve and/or orifice so that the final delivery pressure and flow are as required. The negative consequence of such a system is that the pressure dissipation required is a performance loss, because the work/power used to compress that air is dissipated in the form of total pressure drop.

With reference to FIG. 1, there is shown therein a gas turbine with conventional compressor extraction circuits 10 of the type generally described above. As illustrated, at least a lower pressure extraction circuit 12 and a mid pressure extraction circuit 20 are typically provided. In this exemplary system, the lower pressure extraction line 14 includes a control valve 16 for flow control and an orifice 18 for pressure dissipation. The mid pressure extraction line 22 similarly includes a control valve 24 and an orifice 26.

BRIEF SUMMARY OF THE INVENTION

The invention is embodied in a methodology and corresponding gas turbine cooling and sealing air supply system design for an industrial gas turbine which effectively removes the need to dissipate bleed pressure across an orifice or similar device, thereby to optimize full load ISO performance. Such a system design is realized by providing cross over valves/ejectors which allow mixing of extractions to adjust extraction flow(s) for optimum machine and site condition performance.

Thus, the invention is embodied in a system for bleeding air from plural ports in a multi-stage compressor to provide cooling and/or sealing air to an associated turbine for optimizing gas turbine performance, comprising a first extraction flow path for conducting bleed air from a lower pressure stage of the compressor to the turbine; a second extraction flow path for conducting bleed air from a mid pressure stage of the compressor to the turbine; and a first cross over flow path interconnecting the first extraction flow path and the second extraction flow path for selective cross over flow therebetween, whereby flow through and between the first and second extraction flow paths can be selectively controlled to supply air to the turbine at a proper pressure with an economic mixture of bleed air.

The invention is also embodied in a method for bleeding air from plural ports in a multi-stage compressor to provide cooling and/or sealing air to an associated turbine for optimizing gas turbine performance, comprising: selectively extracting bleed air from a lower pressure stage of the compressor and flowing the low pressure extraction through a first extraction flow path from the lower pressure stage of the compressor toward a first target portion of the turbine; selectively extracting mid pressure bleed air from a mid pressure stage of compressor and selectively flowing the mid pressure bleed air along a second extraction flow path from the mid pressure stage of the compressor toward a second target portion of the turbine; and selectively communicating the first extraction flow path and the second extraction flow path through a first cross over flow path so as to selectively mix air flowing through the first and second extraction flow paths to control pressure of air supplied to at least one of the target portions of the turbine.

BRIEF DESCRIPTION OF THE DRAWINGS

These, as well as other objects and advantages of this invention, will be more completely understood and appreciated by careful study of the following more detailed description of presently preferred exemplary embodiments of the invention taken in conjunction with the accompanying drawings, in which.

DETAILED DESCRIPTION OF THE INVENTION

Figure 2:
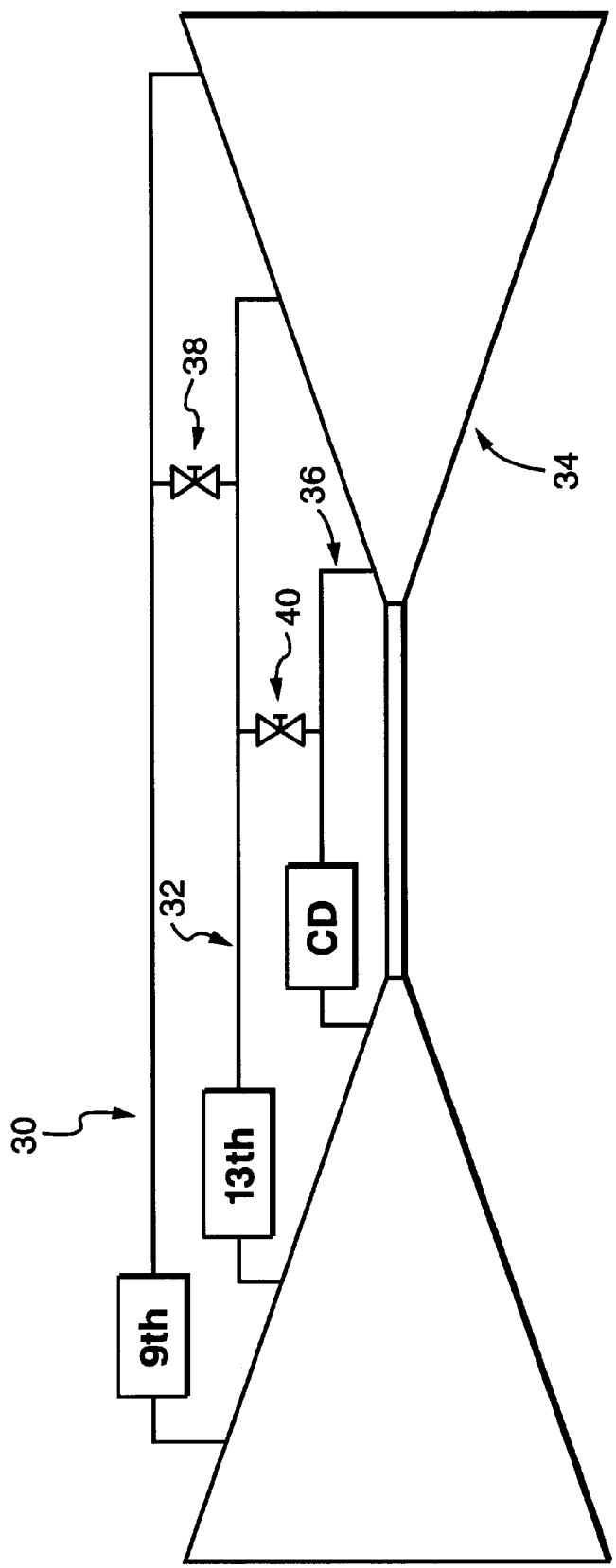
FIG. 2 is a schematic of a gas turbine having optimized extraction in accordance with the invention.

The present invention is embodied in a modification to the conventional extraction system, whereby cross over valves and ejectors are added to mix flows for optimization. This concept is schematically depicted in FIG. 2. A lower pressure extraction 30 and mid-pressure extraction 32 are provided for routing, e.g., cooling air to the turbine 34. In this example, a high pressure extraction 36 from the compressor discharge is included for providing sealing air flow. To allow mixing of extractions to adjust extraction flow(s) for optimizing performance, cross over flow paths with valves/ejectors, schematically illustrated at 38 and 40, link the lower pressure and mid pressure extractions and the mid pressure and high pressure extractions, respectively. As is apparent, then, the method to be used to combine higher pressure air with lower pressure air is to accelerate high pressure air to drop its static pressure to a point where lower pressure air can be mixed with it and then defuse the mixtures to a lower velocity to minimize losses in the delivery system downstream.

Once the air is combined, its combined pressure and temperature is somewhere between the lower and higher pressure extraction air original pressures and temperatures.

Thus, the proper pressure can be supplied with the least expensive, in terms of work invested, mixture of air with the lowest temperature.

Figure 1:
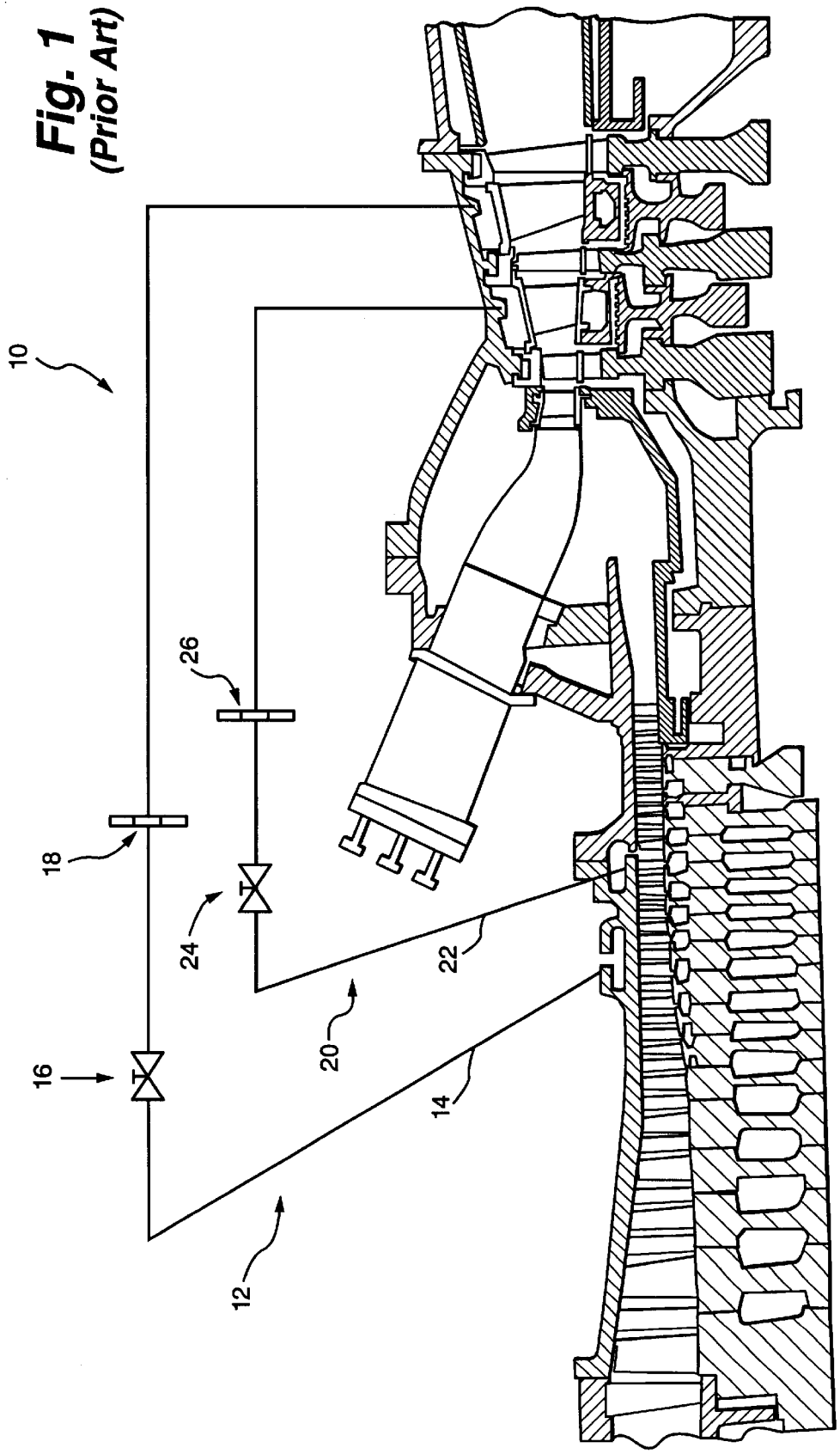
FIG. 1 is a schematic of a gas turbine with conventional compressor extraction circuits.

Care is to be taken in the selection/design of the ejectors so as to minimize mixing losses for ISO day full load design point operation. For off-design points (ambient variation and part load operation), the quantities of lower and higher pressure extraction air is varied. During transients (start up and shut down), the cross over flow paths are not utilized. Rather, the extraction system valves are configured so that the system is equivalent to a conventional design of the type illustrated in FIG. 1. Furthermore, the valving is provided such that the valves either fail in the fully open or the fully closed position, such that in the failed position flows are reverted to those of the conventional design.

At is apparent, with the illustrated combination of ejectors and valves any mixture of extraction air can be achieved and in this manner the use of compressor stator extraction air for turbine cooling and leakage control is optimized. Advantageously, to ensure robustness of the system, redundant measurement and significant monitoring and diagnostics are provided. Thus, a capable modern control system and associated pressure, temperature and/or flow sensors are advantageously adopted in the implementation of the optimized system.

Figure 3:
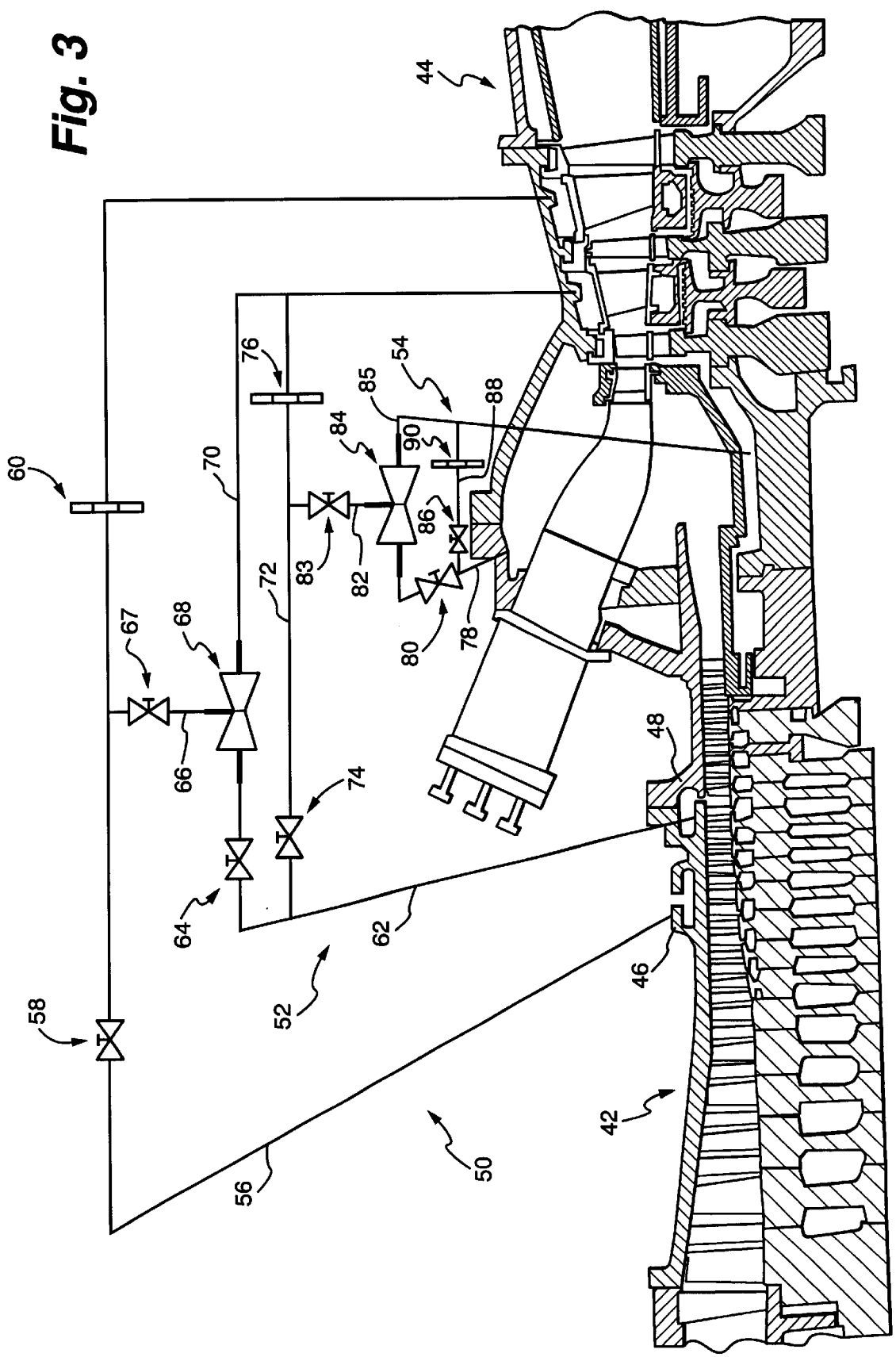
FIG. 3 is a more detailed schematic illustration of a gas turbine with compressor extraction circuits having cross over valves/ejectors in accordance with the invention.

With reference to the more detailed illustration of FIG. 3, there is shown therein an exemplary optimized extraction system for bleeding air from plural ports in a multi-stage compressor 42 to provide cooling and sealing air to the associated turbine 44 for optimizing gas turbine performance.

A first casing portion 46 surrounds a lower pressure stage, e.g., the ninth stage, of the compressor 42 for extracting low pressure bleed air from the compressor. Suitable aperture(s) (not shown in detail) are provided for bleed air flow. A first extraction circuit 50 extends from the first casing portion 46 to the target portion of the turbine for cooling and/or sealing. A second casing portion 48 is further provided downstream from the first casing portion 46, surrounding a mid-pressure stage of the compressor 42. Again, suitable bleed aperture(s) are provided for bleed air extraction. A second extraction circuit 52 is provided for flow of the mid pressure extraction bleed air from the second casing portion to the target portion of the turbine. In accordance with the invention, a cross over path 66 is further provided for selective flow between the lower pressure line 56 and the mid pressure line 62/70.

The illustrated bleed air extraction and supply system further includes a third, high pressure extraction circuit, shown generally at 54, for extracting compressor discharge air. To provide for mixing of extraction flows, a second cross over flow path 82 provides selective flow communication between the mid pressure extraction flow path and the high pressure extraction flow path. To provide for flow between the three extraction circuits, the mid pressure line 62 comprises first and second parallel flow paths 70 and 72. The first flow path 70 is in selective flow communication with the first, lower pressure extraction flow path via the first cross over flow path 66. The high pressure extraction flow path 78, on the other hand, is in selective flow communication with the second parallel flow path 72 via the second cross over flow path 82. Selective flow through the cross over paths is controlled, for example, by control valve 67, provided in the first cross over path 66, and control valve 83, provided in the second cross over flow path 82. In the illustrated embodiment an ejector 68 is defined at the junction of the first cross over path 66 and the first parallel flow path 70. An ejector 84 is similarly provided at the junction of the second cross over flow path 82 and a first parallel flow path 85 of the high pressure extraction flow path 78.

In the illustrated embodiment, furthermore, control valves 58, 64, 74, 80 and 86 are respectively provided in the first extraction flow path 56, the first parallel flow path 70 of the second or mid pressure extraction flow path 62, the second parallel flow path 72 of mid pressure extraction flow path 62, the first parallel flow path 85 of the third or high pressure extraction flow path 78, and the second parallel flow path 88 of high pressure extraction flow path 78, to selectively control and determine the flow of extraction bleed air from the various stages of the compressor to the turbine, as necessary or desirable to optimize performance. As noted above, at times, performance of the gas turbine is 'optimized' by reverting to the conventional flow path configuration, for example during start up and shut down. To that end, control valves 67, 64, 83, and 80 may selectively preclude flow through their respective flow lines to provide for a conventional extraction circuit mode. As illustrated, orifices 60, 76, and 90, for example, are incorporated in the system to provide for pressure dissipation as deemed necessary or desirable, particularly when the system is configured to the conventional design.

As in conventional extraction circuits, it is to be appreciated that additional control and/or pressure dissipation components may be incorporated in the respective flow lines to achieve the desired flows and flow parameter control. Thus, the illustrated valves, orifices and the like are not to be considered limiting in this regard. Moreover, various pressure and temperature sensors may also be disposed in operative communication with the various flow lines as deemed necessary or desirable to monitor and control extraction air flow for optimizing performance. As will be understood, through suitable control of the cross over valve/ ejectors, mixing of the extraction to optimize performance may be readily realized.

While the invention has been described in connection with what is presently considered to be the most practical and preferred embodiment(s), it is to be understood that the invention is not to be limited to the disclosed embodiment, but on the contrary, is intended to cover various modifications and equivalent arrangements included within the spirit and scope of the appended claims.

What is claimed is:

1. A system for bleeding air from plural ports in a multi-stage compressor to provide cooling and/or sealing air to an associated turbine for optimizing gas turbine performance, comprising:

a first casing portion surrounding a lower pressure stage of the compressor, said first casing portion having at least one bleed aperture defined therethrough;

a first extraction flow path for conducting bleed air from said first casing portion to the turbine;

a second casing portion surrounding a mid pressure stage of the compressor, said second casing portion having at least one bleed aperture defined therethrough;

a second extraction flow path for conducting bleed air from said second casing portion to the turbine;

a first cross over flow path interconnecting said first extraction flow path and said second extraction flow path for selective cross over flow therebetween;

a first control valve provided in said first extraction flow path, upstream of said first cross over path;

a second control valve provided in said second extraction flow path, upstream of said first cross over path;

a first cross over control valve provided in said first cross over flow path for selectively controlling flow between said first extraction flow path and said second extraction flow path; and an ejector in flow communication with said first cross over flow path and said second extraction flow path, at a junction therebetween, whereby flow through and between said first and second extraction flow paths can be selectively controlled to supply air to the turbine at a proper pressure with an economic mixture of bleed air, so that the lower pressure, first extraction flow path can be communicated to a target portion of the turbine at a higher pressure than said low pressure extraction.

2. A system for bleeding air as in claim 1, further comprising a third, high-pressure extraction flow path for conducting high pressure bleed air from a compressor discharge extraction manifold to the turbine.

3. A system for bleeding air as in claim 2, further comprising a second cross over flow path defined between said second extraction flow path and said third extraction flow path, and a second cross over control valve provided in said second cross over flow path for selectively controlling flow between said third extraction flow path and said second extraction flow path.

4. A system for bleeding air as in claim 3, wherein said second extraction flow path includes first and second parallel flow paths, said first parallel flow path being in selective flow communication with said first extraction flow path via said first cross over flow path, said third extraction flow path being in selective flow communication with said second parallel flow path via said second cross over flow path.

5. A system for bleeding air as in claim 4, wherein said third extraction flow path includes third and fourth parallel flow paths, said third parallel flow path being in selective flow communication with said second extraction flow path via said second cross over flow path.

6. A system as in claim 3, further comprising an ejector in flow communication with said second cross over flow path and said third extraction flow path, at a junction therebetween.

7. A system as in claim 4, further comprising an ejector in flow communication with said second cross over flow path and said third extraction flow path, at a junction therebetween.

8. A system for bleeding air as in claim 1, wherein said second extraction flow path includes first and second parallel flow paths, said first parallel flow path being in selective flow communication with said first extraction flow path via said first cross over flow path.

9. A method for bleeding air from plural ports in a multi-stage compressor to provide cooling and/or sealing air to an associated turbine for optimizing gas turbine performance comprising:

selectively extracting bleed air from a lower pressure stage of the compressor and flowing said low pressure extraction through a first extraction flow path from said lower pressure stage of said compressor toward a first target portion of said turbine;

selectively extracting mid pressure bleed air from a mid pressure stage of compressor and selectively flowing said mid pressure bleed air along a second extraction flow path from said mid pressure stage of said compressor toward a second target portion of said turbine; and selectively communicating said first extraction flow path and said second extraction flow path through a first cross over flow path via an ejector in flow communication with said first cross over flow path and said second extraction flow path at a junction therebetween, so as to selectively mix air flowing through said second and first extraction flow paths to control pressure of air supplied to at least one of said target portions of said turbine, so that the lower pressure, first extraction flow path can be communicated to a said target portion at a higher pressure than said low pressure extraction.

10. A method for bleeding air as in claim 9, further comprising selectively extracting high pressure bleed air from a high pressure section of the compressor and flowing said high pressure bleed air along a third extraction flow path from said high pressure section of said compressor toward a third target portion of said turbine.

11. A method for bleeding air as in claim 10, further comprising selectively communicating said third extraction flow path and said second extraction flow path through a second cross over flow path so as to selectively mix air flowing through said third and second extraction flow paths to control pressure of air supplied to at least one of said target portions of said turbine.

12. A method for bleeding air as in claim 11, further comprising splitting said flow in said second extraction flow path for selective flow through one of at least first and second parallel flow paths, said first parallel flow path being in selective flow communication with said first extraction flow path via said first cross over path and said third extraction flow path being in selective flow communication with said second parallel flow path via said second cross over path.

13. A method for bleeding air as in claim 12, further comprising splitting said flow in said third extraction flow path for selective flow through one of at least third and fourth parallel flow paths, said third parallel flow path being in selective flow communication with said second extraction flow path via said second cross over path.

14. A method for bleeding air as in claim 9, further comprising splitting said flow in said second extraction flow path for selective flow through one of at least first and second parallel flow paths, said first parallel flow path being in selective flow communication with said first extraction flow path via said first cross over path.

15. A system for bleeding air from plural ports in a multi-stage compressor to provide cooling and/or sealing air to an associated turbine for optimizing gas turbine performance, comprising:

a first casing portion surrounding a lower pressure stage of the compressor, said first casing portion having at least one bleed aperture defined therethrough;

a first extraction flow path for conducting bleed air from said first casing portion to the turbine;

a second casing portion surrounding a mid pressure stage of the compressor, said second casing portion having at least one bleed aperture defined therethrough;

a second extraction flow path for conducting bleed air from said second casing portion to the turbine;

a first cross over flow path interconnecting said first extraction flow path and said second extraction flow path for selective cross over flow therebetween;

a first control valve provided in said first extraction flow path, upstream of said first cross over path;

a second control valve provided in said second extraction flow path, upstream of said first cross over path;

a first cross over control valve provided in said first cross over flow path for selectively controlling flow between said first extraction flow path and said second extraction flow path, whereby flow through and between said first and second extraction flow paths can be selectively controlled to supply air to the turbine at a proper pressure with an economic mixture of bleed air;

a third, high-pressure extraction flow path for conducting high pressure bleed air from a compressor discharge extraction manifold to the turbine; and a second cross over flow path defined between said second extraction flow path and said third extraction flow path, and a second cross over control valve provided in said second cross over flow path for selectively controlling flow between said third extraction flow path and said second extraction flow path, wherein said second extraction flow path includes first and second parallel flow paths, said first parallel flow path being in selective flow communication with said first extraction flow path via said first cross over flow path, said third extraction flow path being in selective flow communication with said second parallel flow path via said second cross over flow path, and wherein said third extraction flow path includes first and second parallel flow paths, said first flow path of said third extraction flow path being in selective flow communication with said second parallel flow path of said second extraction flow path via said second cross over flow path.

16. A method for bleeding air from plural ports in a multi-stage compressor to provide cooling and/or sealing air to an associated turbine for optimizing gas turbine performance comprising:

selectively extracting bleed air from a lower pressure stage of the compressor and flowing said low pressure extraction through a first extraction flow path from said lower pressure stage of said compressor toward a first target portion of said turbine;

selectively extracting mid pressure bleed air from a mid pressure stage of compressor and selectively flowing said mid pressure bleed air along a second extraction flow path from said mid pressure stage of said compressor toward a second target portion of said turbine;

selectively communicating said first extraction flow path and said second extraction flow path through a first cross over flow path so as to selectively mix air flowing through said second and first extraction flow paths to control pressure of air supplied to at least one of said target portions of said turbine;

selectively extracting high pressure bleed air from a high pressure section of the compressor and flowing said high pressure bleed air along a third extraction flow path from said high pressure section of said compressor toward a third target portion of said turbine;

selectively communicating said third extraction flow path and said second extraction flow path through a second cross over flow path so as to selectively mix air flowing through said third and second extraction flow paths to control pressure of air supplied to at least one of said target portions of said turbine; and splitting said flow in said second extraction flow path for selective flow through one of at least first and second parallel flow paths, said first parallel flow path being in selective flow communication with said first extraction flow path via said first cross over path and said third extraction flow path being in selective flow communication with said second parallel flow path of said second parallel flow path via said second cross over path;

splitting said flow in said third extraction flow path for selective flow through one of at least first and second parallel flow paths, said first parallel flow path of said third extraction flow path being in selective flow communication with said second extraction flow path via said second cross over path.

* * * * *